United States Patent
Schroeder et al.

(10) Patent No.: US 11,679,767 B2
(45) Date of Patent: Jun. 20, 2023

(54) METHOD AND DEVICE FOR VEHICLE CONTROL

(71) Applicant: Robert Bosch GmbH, Stuttgart (DE)

(72) Inventors: Gernot Schroeder, Ludwigsburg (DE); Matthias Haug, Renningen (DE); Maxim Dolgov, Renningen (DE); Thomas Michalke, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 218 days.

(21) Appl. No.: 17/177,475

(22) Filed: Feb. 17, 2021

(65) Prior Publication Data
US 2021/0276549 A1 Sep. 9, 2021

(30) Foreign Application Priority Data

Mar. 5, 2020 (DE) .......................... 102020202811.7

(51) Int. Cl.
*B60W 30/12* (2020.01)
*G08G 1/16* (2006.01)
(Continued)

(52) U.S. Cl.
CPC ........ *B60W 30/12* (2013.01); *B60W 30/0956* (2013.01); *B60W 40/06* (2013.01);
(Continued)

(58) Field of Classification Search
CPC .. B60W 30/12; B60W 30/0956; B60W 40/06; B60W 50/14; B60W 30/16;
(Continued)

(56) References Cited

U.S. PATENT DOCUMENTS

2011/0022317 A1* 1/2011 Okita .................... B60W 30/12
701/301
2015/0177007 A1* 6/2015 Su ....................... B60W 30/165
701/25
(Continued)

FOREIGN PATENT DOCUMENTS

WO WO-2019214783 A1 * 11/2019 ......... G06K 9/00798

OTHER PUBLICATIONS

Machine Translation of the Description of WO-2019214783-A1 (Year: 2019).*

*Primary Examiner* — Anne Marie Antonucci
*Assistant Examiner* — Connor L Knight
(74) *Attorney, Agent, or Firm* — Norton Rose Fulbright US LLP; Gerard Messina

(57) ABSTRACT

A method for vehicle control. The method includes a step of reading in a camera signal, a step of executing a semantic segmentation, and a step of ascertaining a control signal. The camera signal represents an optically detected image of a roadway to be driven by a vehicle. In the step of executing, the semantic segmentation of the image represented by the camera signal is executed, to detect a free area ahead of the vehicle from the image as a drivable road section. In addition, a roadway signal representing the detected drivable road section is provided. In the step of ascertaining, the control signal for activating at least one vehicle component is ascertained, using the roadway signal.

11 Claims, 4 Drawing Sheets

(51) Int. Cl.
   *B60W 40/06* (2012.01)
   *B60W 50/14* (2020.01)
   *B60W 30/095* (2012.01)
   *B60W 30/16* (2020.01)

(52) U.S. Cl.
   CPC ............ *B60W 50/14* (2013.01); *G08G 1/167* (2013.01); *B60W 30/16* (2013.01); *B60W 2420/42* (2013.01)

(58) Field of Classification Search
   CPC .......... B60W 2420/42; B60W 2552/53; G08G 1/167; G08G 1/16
   See application file for complete search history.

(56) References Cited

U.S. PATENT DOCUMENTS

2019/0065867 A1\* 2/2019 Huang ...................... G06T 7/10
2021/0097309 A1\* 4/2021 Kaku ................... B60W 40/06

\* cited by examiner

METHOD AND DEVICE FOR VEHICLE CONTROL

CROSS REFERENCE

The present application claims the benefit under 35 U.S.C. § 119 of German Patent Application No. DE 102020202811.7 filed on Mar. 5, 2020, which is expressly incorporated herein by reference in its entirety.

FIELD

The present invention is directed to a device and a method for vehicle control. The present invention also relates to a computer program.

BACKGROUND INFORMATION

A vehicle may include a monocamera-based sensor unit for automated or semi-automated driving systems, for example for a lane-keeping assistance function or a distance control function. In the process, other vehicles and lane markings, for example, may be detected with the aid of an object recognition. The object recognition may be dependent on surroundings conditions, such as for example heavy rain or oncoming lights, of the traveling vehicle.

SUMMARY

The present invention provides a method for vehicle control, a device using this method, and fa corresponding computer. The measures disclosed herein allow advantageous refinements of and improvements on the device in accordance with the present invention.

In accordance with an example embodiment of the present invention, a vehicle control based on an evaluation of an optically detected image may be improved by an evaluation of the image with the aid of semantic segmentation. The evaluation with the aid of semantic segmentation advantageously makes it possible to detect a drivable road section, based on the image of an area of image points which are coherent in terms of content. This is advantageously also possible quickly and reliably under adverse surroundings conditions since a traditional object recognition is dispensable, which may be limited as a result of surroundings conditions, for example during heavy rain or oncoming lights. Based on the road section detected with the aid of semantic segmentation, a control signal may then be ascertained for activating a trip of the vehicle on the drivable road section.

A method for vehicle control is described. In accordance with an example embodiment of the present invention, the method includes at least one step of reading in a camera signal, a step of executing a semantic segmentation, and a step of ascertaining a control signal. The camera signal read in in the step of reading in represents an optically detected image of a roadway to be driven by a vehicle. In the step of executing, the semantic segmentation of the image represented by the camera signal is executed, to detect a free area ahead of the vehicle from the image as a drivable road section. In addition, a roadway signal is provided in the step of executing. The roadway signal represents a result of the semantic segmentation, i.e., the detected drivable road section. In the step of ascertaining, the control signal for activating at least one vehicle component is ascertained, using the roadway signal.

The vehicle may be a motor vehicle, a truck, a bus, a motorcycle or an industrial truck. The vehicle may have a semi-automated or fully automated driving operation. The camera signal may, for example, be provided by an optical surroundings detection unit of the vehicle. During the execution of the semantic segmentation, it is possible to form regions which are coherent in terms of content from a combination of adjoining image points, for example pixels, in order to segment the drivable area of the roadway as a cohesive area and provide it as a detected drivable road section. In the process, the area is a free area insofar as no other object potentially impairing a safe driving of the vehicle, such as another vehicle or a foreign object situated on the roadway, is present within this area. The control signal for activating the at least one vehicle component may, for example, be provided to a control unit of the vehicle or to the vehicle component. The vehicle component is, for example, a driver assistance system, such as a lane-keeping assistant or a distance control, or a braking device, an acceleration device or a steering device. The control signal is, for example, designed to change a setting of the vehicle component, or to activate or to deactivate a driving system.

According to one specific example embodiment of the present invention, the control signal may additionally be ascertained using a marking signal in the step of ascertaining. The marking signal represents a detected lane marking. The detected lane marking is based, for example, on an evaluation of the camera signal with the aid of a traditional object recognition. Advantageously, it is thus possible to combine the pieces of information of the detected lane marking and of the drivable road section detected with the aid of the semantic segmentation, in order to activate the vehicle component.

According to one specific example embodiment of the present invention, the control signal may additionally be ascertained using a vehicle identification signal in the step of ascertaining. The vehicle identification signal represents a detected preceding vehicle. Advantageously, it is thus possible to identify an object present in the area of the optical image which limits the detected drivable road section, for example with respect to a length or a width, as a preceding vehicle, for example to implement a following vehicle function.

According to one specific example embodiment of the present invention, the step of executing the semantic segmentation may be carried out repeatedly to detect an occurrence of a change of an extension of the drivable road section. In the process, a length and, additionally or alternatively, a width of at least two detected drivable road sections may be compared, for example continuously or at certain time intervals, to detect an occurring change, for example a suddenly occurring change such as a shortening of the road segment which occurs suddenly with respect to a driving speed of the vehicle and a preceding vehicle, for example when another vehicle merges into the roadway or when the preceding vehicle changes lanes. The detected change of the extension of the detected drivable road section may be provided in the form of an extension signal in the step of executing. In the step of ascertaining, the control signal may then be ascertained using the extension signal.

According to one specific example embodiment of the present invention, in the step of ascertaining, the control signal may be ascertained for activating a transverse guidance of the vehicle within the detected drivable road section. The control signal may, for example, be designed to set an orientation of the vehicle on the road section during the negotiation of the detected drivable road section, for example with the aid of an activation of a steering device of the vehicle.

According to one specific example embodiment of the present invention, in the step of ascertaining, the control signal may furthermore be ascertained for activating a longitudinal guidance of the vehicle with respect to a detected end of the detected drivable road section. This advantageously enables a use of the control signal, for example, for a driver assistance system for automatically maintaining a distance, or for an active cruise control function. The control signal may then, for example, be designed to activate a speed or an acceleration of the vehicle.

According to one specific example embodiment of the present invention, the control signal may furthermore be ascertained as a function of a threshold value in the step of ascertaining. The threshold value may, for example, represent a minimally required width or length for a safe driving of the vehicle in the area of the detected drivable road section. For this purpose, the threshold value may be preset or read in, to determine the threshold value, for example depending on the vehicle type or depending on a condition of a ground to be driven or a surroundings condition or a speed of the vehicle.

Depending on the threshold value, according to one specific example embodiment of the present invention, a warning signal for outputting a warning which is acoustically and, additionally or alternatively, visually perceptible to the driver may additionally be ascertained in the step of ascertaining. The warning signal may be provided, for example, when a shortening of the detected drivable road section occurs, for example when another vehicle suddenly cuts in from an adjoining lane onto the detected drivable road section.

According to one specific example embodiment of the present invention, the control signal may also be ascertained using a read-in trip parameter in the step of ascertaining, to set a trip parameter. The read-in trip parameter may, for example, represent a speed or steering wheel position of the vehicle. The ascertained control signal may then be designed to activate a changing of a set trip parameter, for example also to activate a setting of a longitudinal guidance or a transverse guidance of the vehicle, as a function of the read-in trip parameter.

According to one specific example embodiment of the present invention, the method may additionally include a step of optically detecting the roadway to be driven by the vehicle, using a monocamera sensor unit, to provide the camera signal. The monocamera sensor unit may, for example, include a monocular camera system. For detecting the roadway to be driven by the vehicle, the monocamera sensor unit may, for example, include a detection area oriented in a driving direction.

The example method(s) may, for example, be implemented in software or hardware or in a mixed form made up of software and hardware, for example in a control unit.

The approach presented here furthermore provides a device which is designed to carry out, activate or implement the steps of one variant of a method described here in appropriate units. The object underlying the present invention may also be achieved quickly and efficiently by this embodiment variant of the present invention in the form of a device.

For this purpose, the device may include at least one processing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data which are embedded into a communication protocol. The processing unit may be a signal processor, a microcontroller or the like, for example, it being possible for the memory unit to be a Flash memory, an EEPROM or a magnetic memory unit. The communication interface may be designed to read in or output data wirelessly and/or in a hard-wired manner, a communication interface which may read in or output hard-wired data being able to read in these data, for example electrically or optically, from a corresponding data transmission line or being able to output these in a corresponding data transmission line.

A device may presently be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, alongside other software modules.

In addition, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the present invention are shown in the figures and are described in greater detail below.

DETAILED DESCRIPTION OF EXAMPLE EMBODIMENTS

Figure 1:
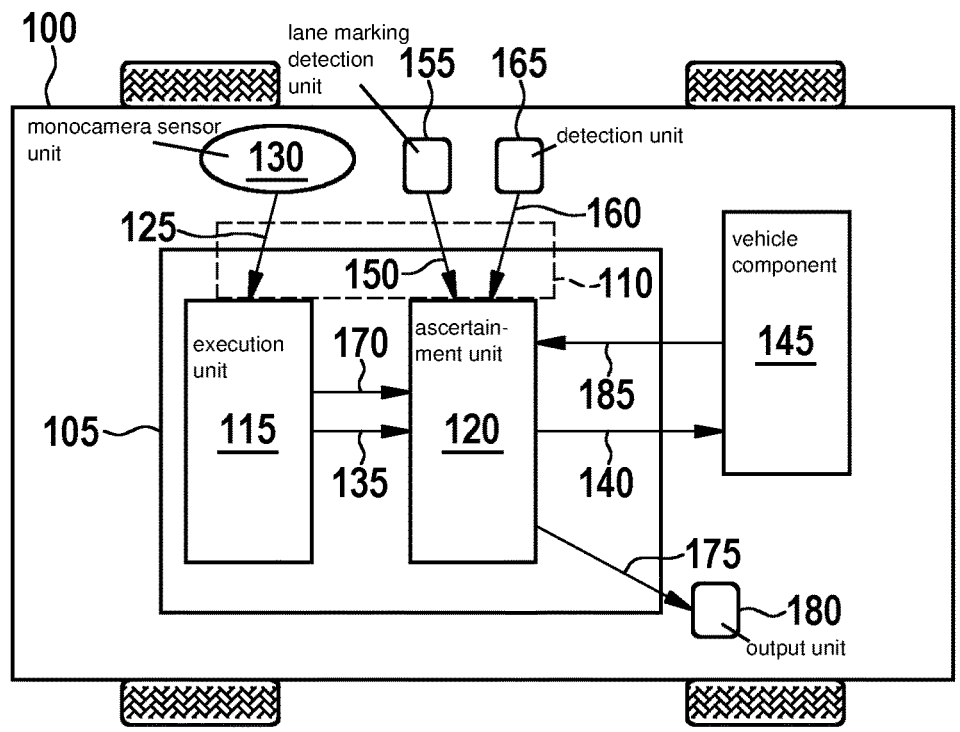
FIG. 1 shows a schematic representation of a vehicle including a device for vehicle control according to one exemplary embodiment of the present invention.

In the following description of favorable exemplary embodiments of the present invention, identical or similar reference numerals are used for similarly acting elements shown in the different figures, and a repeated description of these elements is dispensed with.

FIG. 1 shows a schematic representation of a vehicle 100 including a device 105 for vehicle control according to one exemplary embodiment. Device 105 includes a read-in interface 110, an execution unit 115, and an ascertainment unit 120. Device 105 is designed to read in a camera signal 125 via read-in interface 110. Camera signal 125 represents an optically detected image of a roadway to be driven by vehicle 100. Here, camera signal 125 is provided by way of example by a monocamera sensor unit 130 of vehicle 100. Execution unit 115 is designed to execute a semantic segmentation of the image represented by camera signal 125, to detect a free area ahead of vehicle 100 from the image as a drivable road section. In addition, execution unit 115 is designed to provide a roadway signal 135 representing the detected drivable road section. Here, roadway signal 135 is provided to ascertainment unit 120. Ascertainment unit 120 is designed to ascertain a control signal 140, using roadway signal 135, for activating at least one vehicle component 145 of vehicle 100. Vehicle component 145 of the vehicle is a control unit, a steering device, a braking device or an acceleration device of vehicle 100, for example. Using control signal 140, it is thus possible, for example, to set a driving speed and, additionally or alternatively, a driving direction of vehicle 100 in the detected road section to be driven.

According to the exemplary embodiment shown here, ascertainment unit 120 is designed to additionally ascertain control signal 135 using a marking signal 150. Marking signal 150 represents a detected lane marking. Marking signal 150 is provided, for example, by a lane marking detection unit 155 of vehicle 100. The detected lane marking is, for example, a marking detected with the aid of traditional object recognition, using camera signal 125. Advantageously, it is thus possible to use a lane detection which is based on an object recognition, for example, in a complementary manner to the detection of the road section with the aid of semantic segmentation.

According to the exemplary embodiment shown here, ascertainment unit 120 is furthermore designed to additionally ascertain control signal 140 using a vehicle identification signal 160. Vehicle identification signal 160 represents a detected preceding vehicle. Here, vehicle identification signal 160 is provided by way of example by a detection unit 165 of vehicle 100. Detection unit 165 includes a LIDAR or radar sensor system for detecting the preceding vehicle, for example, or detection unit 165 is designed to detect the preceding vehicle, using camera signal 125 and an object recognition.

According to one exemplary embodiment, execution unit 115 is designed to repeatedly execute the semantic segmentation to detect an occurrence of a change of an extension of the drivable road section. In this case, execution unit 115 is furthermore designed to provide an extension signal 170, which represents the detected change of the extension of the detected drivable road section. Ascertainment unit 120 is then designed to ascertain control signal 140 using extension signal 170. Advantageously, it is thus possible to quickly and reliably detect a preceding vehicle cutting in or pulling out, to detect a change in the drivable road section.

According to one exemplary embodiment, ascertainment unit 120 is furthermore designed to ascertain control signal 140 for activating a transverse guidance of vehicle 100 within the detected drivable road section. Roadway signal 135 includes, for example, a piece of information regarding a length and a width of the detected drivable road section. For activating the transverse guidance of vehicle 100, control signal 140 is, for example, designed to activate a setting of a steering angle of a steering device of vehicle 100.

According to one exemplary embodiment, ascertainment unit 120 is additionally designed to ascertain control signal 140 for activating a longitudinal guidance of the vehicle with respect to a detected end of the detected drivable road section. For activating the longitudinal guidance of vehicle 100, control signal 140 is, for example, designed to activate a setting of a speed or an acceleration of vehicle 100. This is advantageous, for example, to enable an assistance function of vehicle 100 to automatically maintain the distance from a preceding vehicle, using control signal 140.

According to one exemplary embodiment, ascertainment unit 120 is also designed to ascertain control signal 140 as a function of a threshold value with respect to a minimal width or length of the detected drivable road section. The threshold value is preset, for example, or is read in via read-in interface 110, for example to use the threshold value as a function of a known speed limit on the road section to be driven.

According to the exemplary embodiment shown here, ascertainment unit 120 is also designed to additionally provide a warning signal 175 for outputting a warning which is acoustically and, additionally or alternatively, visually perceptible to the driver, as a function of the threshold value. Warning signal 175 is provided here, by way of example, to an output unit 180 of vehicle 100.

For setting at least one trip parameter, for example a speed of vehicle 100 or a driving direction or trajectory of vehicle 100, according to the exemplary embodiment shown here, ascertainment unit 120 is designed to ascertain control signal 140, using a read-in trip parameter 185, for setting a trip parameter. For this purpose, for example, at least one set trip parameter 185, in the form of a trip parameter signal, is read in via the read-in interface 110, and control signal 140 is ascertained using the trip parameter signal to activate a change in trip parameter 185 and, additionally or alternatively, a further trip parameter.

Here, camera signal 125 is provided by monocamera sensor unit 130 of vehicle 100. As an alternative, device 100 may also include a detection unit, for example a monocular optical detection unit, which is designed to optically detect the roadway to be driven by vehicle 100 in order to provide camera signal 125.

Figure 2:
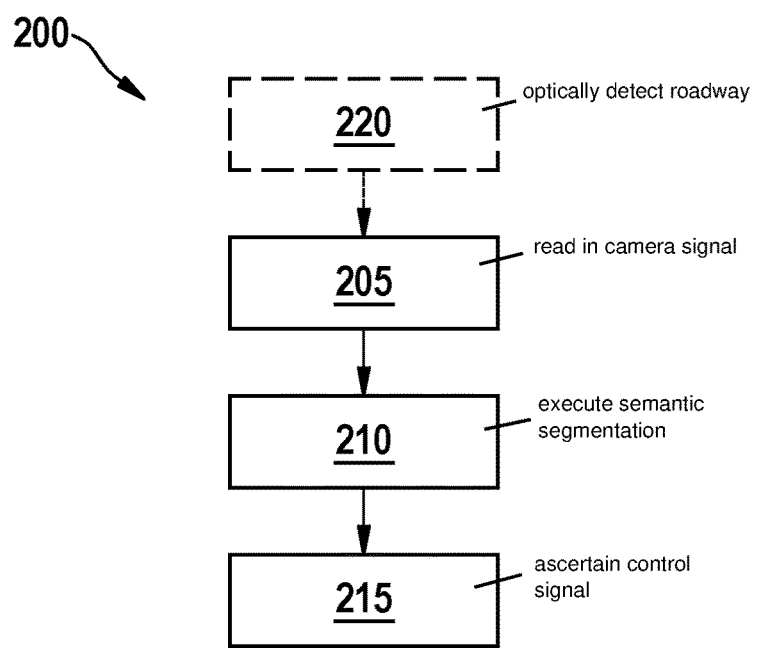
FIG. 2 shows a flow chart of a method for vehicle control according to one exemplary embodiment of the present invention.

FIG. 2 shows a flowchart of a method 200 for vehicle control according to one exemplary embodiment. Method 200 is executable, for example, using an exemplary embodiment of the above-described device for vehicle control. Method 200 includes at least one step 205 of reading in, a step 210 of executing, and a step 215 of ascertaining. In step 205 of reading in, a camera signal is read in, which represents an optically detected image of a roadway to be driven by a vehicle. In step 210 of executing, a semantic segmentation of the image represented by the camera signal is executed, to detect a free area ahead of the vehicle from the image as a drivable road section. In addition, a roadway signal is provided in step 210 of executing, which represents the detected drivable road section. In step 215 of ascertaining, a control signal for activating at least one vehicle component is ascertained, using the roadway signal.

According to the exemplary embodiment shown here, method 200 additionally includes an optional step 220 of optically detecting. In step 220 of optically detecting, the roadway to be driven by the vehicle is optically detected, using a monocamera sensor unit, to provide the camera signal. Step 220 is optionally executed prior to step 205.

Figure 3:
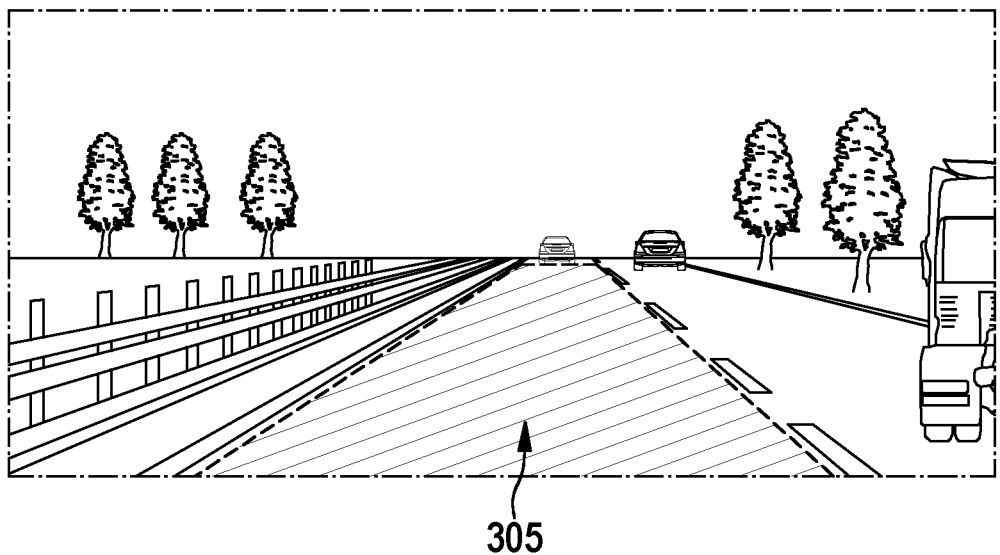
FIG. 3 shows an illustration of a drivable road section detected with the aid of semantic segmentation, in accordance with an example embodiment of the present invention.

FIG. 3 shows an illustration of a drivable road section 305 detected with the aid of semantic segmentation. Shown is the detected road section 305 of a semantic segmentation of an ego-lane of a vehicle in a rain sequence with poorly visible lane markings of the ego-lane. In the driving situation shown here, the use of one exemplary embodiment of the device for vehicle control is advantageous to support or replace a transverse guidance of the vehicle which is reaching system limits for situational reasons, in the event of poorly visible lane markings. Using the approach described based on the preceding figures, it is advantageously possible to detect an ego-lane, identified with the aid of semantic segmentation, for the improvement of the longitudinal and transverse guidance of the vehicle as drivable road section 305.

The use of semantic segmentation for the detection of drivable road section 305, and for the activation of a vehicle component as a function of the detected drivable road section 305, is, in particular, also advantageous during a control of a vehicle using a monocamera-based sensor approach, for example enabling an integration of a machine learning-based detection of drivable road section 305, the "holistic ego-lane" during the activation of (semi-)automated driving systems. In the case of oncoming lights and a reflecting road surface after rain, for example, it is possible that traditional object recognition approaches for detecting lane markings and vehicles are not usable, or only usable to a limited extent, with single-sensor systems, such as a monovideo-based lane-keeping assistant. In such a case, it is advantageous to use the semantic segmentation in a manner that is complementary or alternative to the traditional object recognition to also offer a driver of the vehicle automated assistance in such a challenging situation.

The semantic segmentation as a machine learning method is usable for this purpose, for example, as a complementary path to traditional, model-based methods, for example for additional robustness. During the semantic segmentation, the drivable surface area or the lane used by the ego-vehicle is segmented in the pixel image as a cohesive area to detect the area as a drivable road section 305.

The use of the semantic segmentation is advantageous, in particular, in the case of oncoming lights and reflecting surfaces since such a network also always utilizes the entire scene context for the perception task. During the segmentation of the ego-lane, for example, the piece of information about a preceding vehicle is also always utilized, and not only the pure roadway markings, as with traditional methods. Based on the drivable road section 305 thus detected, it is possible to activate a longitudinal and transverse guidance of the vehicle. It is possible, for example, as a result of the entire context (including preceding vehicles) of a scenario, even in the event of bright oncoming lights and a reflecting roadway in which a traditional lane marking identification, and also a traditional vehicle identification, are possibly limited, to use edges of the drivable road section 305 detected by semantic segmentation in order to implement, based thereon, a transverse control of the vehicle. Under favorable conditions, an at least complementary use of the machine learning-based approach of the semantic segmentation described here is advantageous, or a combined use of a traditional object recognition and the semantic segmentation, as is described hereafter based on FIG. 7.

Figure 4:
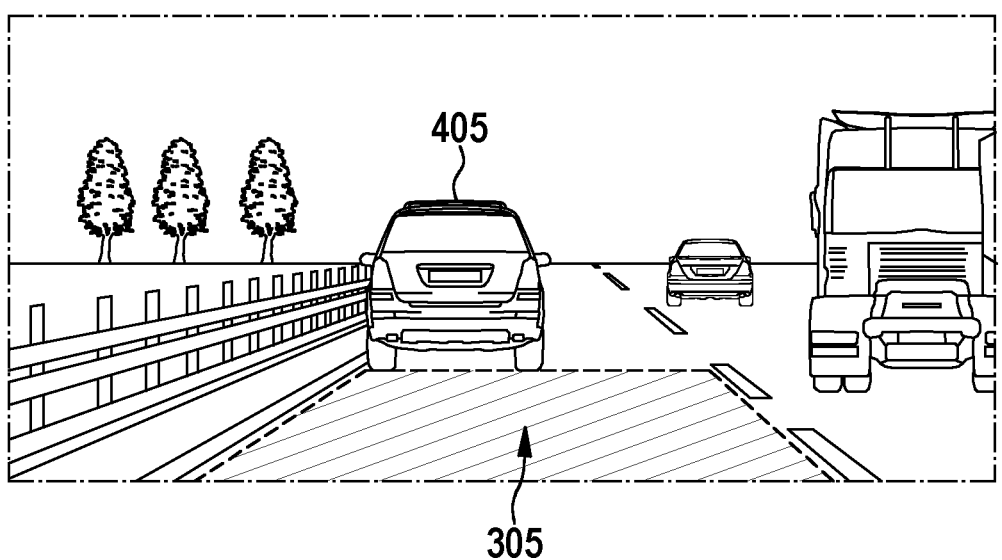
FIG. 4 shows an illustration of a drivable road section detected with the aid of semantic segmentation, in accordance with an example embodiment of the present invention.

FIG. 4 shows an illustration of a drivable road section 305 detected with the aid of semantic segmentation. Shown is an exemplary scenario in which a semantic segmentation is advantageous for detecting the drivable road section 305, for example to activate or to support a vehicle distance control, using the detected drivable road section 305. In the shown scenario, with bright sunshine, it is possible for edges of the vehicle to cause reflections, which may result in large intensity differences. In principle, intensity differences are typical features which are used in traditional methods for object classification. Reflections, however, are potentially too irregular in their position and intensity, and thus result in features which differ from the object features during normal illumination. An intensity normalization of the features is also typically used, which may result in typical object features to be suppressed with bright sunshine, whereby an object plausibility check may be delayed or impossible. In the scenario shown here, the approach of the vehicle control described here is thus advantageous, using the drivable road section 305 detected with the aid of semantic segmentation: If the drivable road section 305 ends suddenly and in close proximity to the vehicle, and no preceding vehicle 405 was detected, it is to be assumed that a vehicle, preceding vehicle 405, is situated at the end of road section 305 detected as drivable. In this case, it is advantageous to regulate the end of the detected drivable road section 305 for the longitudinal guidance of the vehicle to the end of the ego-lane.

Figure 5:
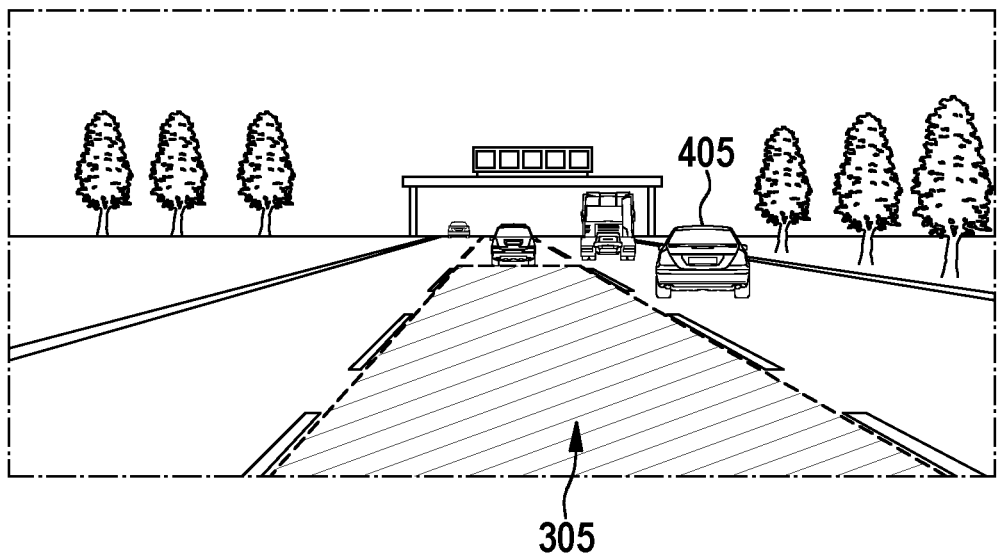
FIG. 5 shows an illustration of a drivable road section detected with the aid of semantic segmentation, in accordance with an example embodiment of the present invention.

FIG. 5 shows an illustration of a drivable road section 305 detected with the aid of semantic segmentation. Shown is an exemplary scenario in which a semantic segmentation for detecting drivable road section 305 is advantageous, here a situation with rain and an object, a preceding vehicle 405, just before merging into a lane of the vehicle. With the aid of the approach described here of executing the semantic segmentation, it is advantageously possible to reliably identify an object, such as the merging preceding vehicle 405, at an early stage: If a sudden shortening of the detected drivable road section 305 occurs, a cutting-in process is to be assumed, and an adaptation of the automatic longitudinal control with the aid of the control signal is possible. The same approach is usable for an early recognition of a lane-change process. In this case, it is possible to activate an early acceleration of an automatic longitudinal guidance of the vehicle, which results in a noticeable gain of dynamics, and is perceived by the driver as human-like behavior.

In addition, it is possible to use a change or deformation of the machine learning-based ego-lane, i.e., of the detected drivable road section 305, for anomaly detection, for example for vehicles protruding into the roadway, which are possibly not identified as relevant objects for the longitudinal control with the aid of traditional approaches, or in the case of objects in the area of the detected drivable road section 305, for example lost cargo on the roadway.

In these cases, an ascertainment of a driver warning and, additionally or alternatively, an automatic longitudinal or transverse intervention, using the control signal, is possible. The approach described here of the vehicle control with the aid of drivable road section 305 detected by semantic segmentation is also advantageous with a vehicle including a plurality of sensors, for example with a vehicle including multi-sensor assistance systems, for example as additional protection or so-called "fallback solution" in the event of an impairment or a failure of other sensor systems, for example of the radar and/or LIDAR sensor system. In this case, it is also possible, for example, to activate or support a driving mode having a limited functional range (e.g., without lane change, with limited speed). In addition, it is possible, in the case of a highly automated system, to bridge a time until a driver is able to take over the driving task again after recognition of the sensor failure.

Figure 6:
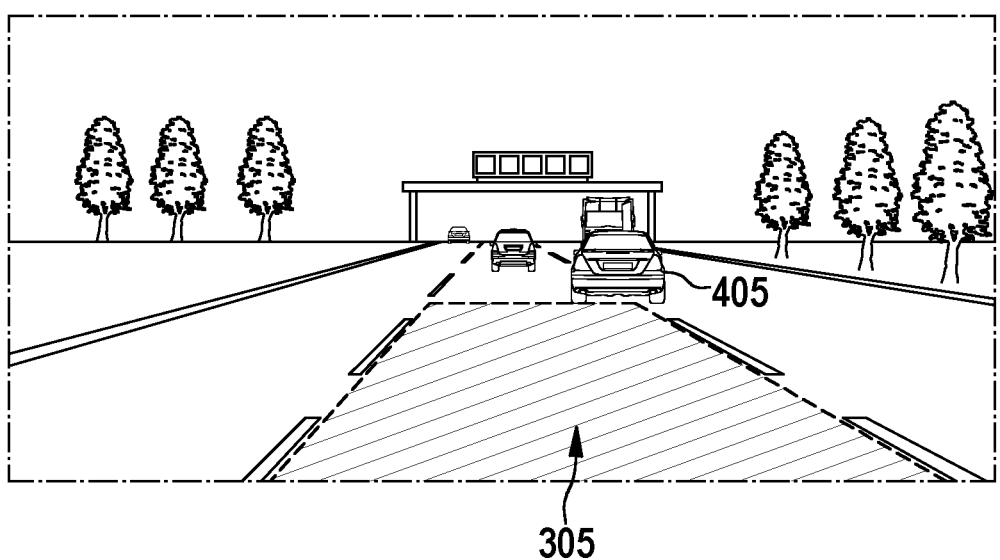
FIG. 6 shows an illustration of a drivable road section detected with the aid of semantic segmentation, in accordance with an example embodiment of the present invention.

FIG. 6 shows an illustration of a drivable road section detected with the aid of semantic segmentation. Shown is a succession scenario of the application situation described based on FIG. 5: preceding vehicle 405 is shown here during the merging into the area previously detected as drivable road section 305. As a result of the merging of preceding vehicle 405, road section 305 detected as drivable is shortened, and the object is recognized as preceding vehicle 405.

Figure 7:
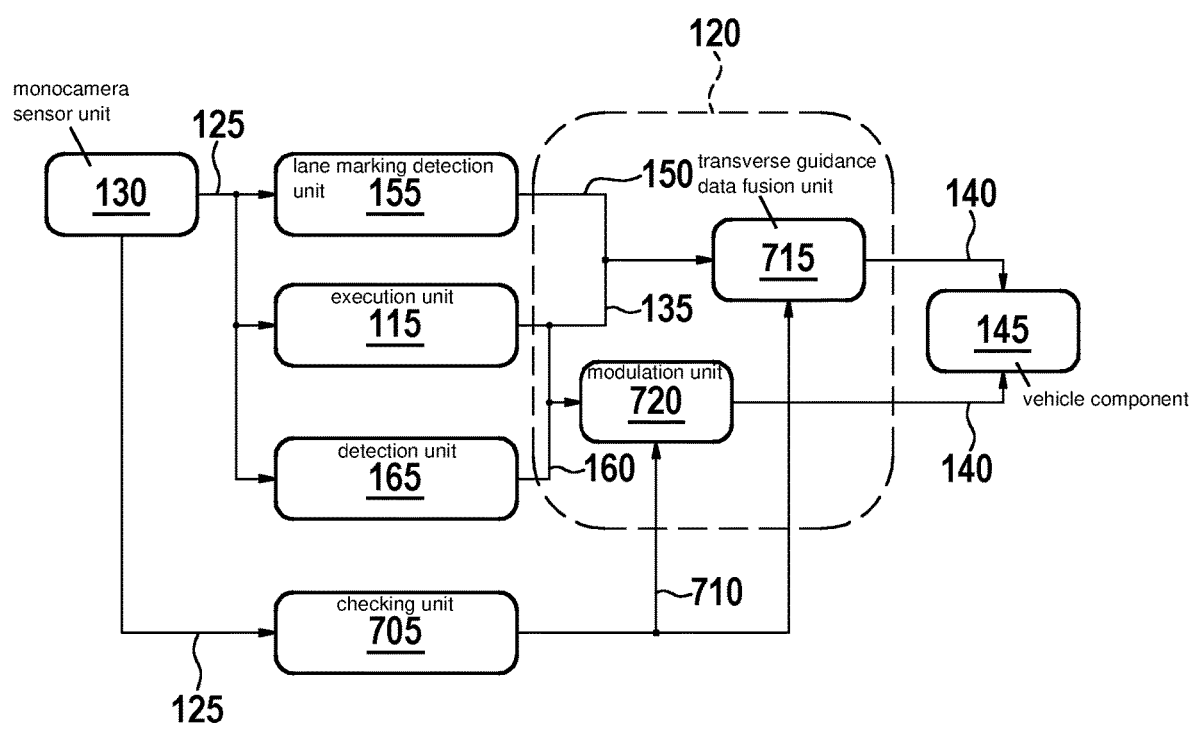
FIG. 7 shows a signal flowchart of a method for vehicle control according to one exemplary embodiment of the present invention.

FIG. 7 shows a signal flowchart of a method for vehicle control according to one exemplary embodiment. Shown is an exemplary integration of a machine learning-based ego-path, i.e., an exemplary application of the approach described here of the detection of the drivable road section with the aid of semantic segmentation and the vehicle control based on the detected drivable road section.

In the signal flowchart shown here, traditional perception approaches for a transverse guidance, i.e., a model-based recognition of lane markings, and a longitudinal guidance, i.e., a classification of objects are supplemented with the aid of pattern recognition, such as Viola Jones or a support vector machine (SVM) as a result of a preferably complementary ML-based path, the semantic segmentation of the ego-lane.

In the exemplary embodiment shown here, camera signal 125 is provided by a monovideo sensor, monocamera sensor unit 130. Here, camera signal 125, by way of example, is provided to lane marking recognition unit 155, execution unit 115, detection unit 165, and a checking unit 705. Lane marking recognition unit 155 executes a traditional lane marking recognition and provides marking signal 150 to ascertainment unit 120. Execution unit 115 executes the semantic segmentation of the ego-lane and provides roadway signal 135. Detection unit 165 carries out a traditional vehicle identification and provides vehicle identification signal 160. Checking unit 705 carries out an availability check of the traditional approaches and provides a modulation signal 710. Ascertainment unit 120 here includes a transverse guidance data fusion unit 715 and a longitudinal guidance data fusion unit 720. Modulation signal 710 is provided for a modulating influence on the data fusions to transverse guidance data fusion unit 715 and longitudinal guidance data fusion unit 720. In addition, marking signal 150 and roadway signal 135 are provided to transverse guidance data fusion unit 715. According to the exemplary embodiment shown here, transverse guidance data fusion unit 715 is designed to ascertain control signal 140 for the transverse guidance, using marking signal 150, roadway signal 135 and modulation signal 710, and to provide control signal 140 for the transverse guidance to a vehicle controller as vehicle component 145. Vehicle identification signal 160 and roadway signal 135 are provided to longitudinal guidance data fusion unit 720. According to the exemplary embodiment shown here, longitudinal guidance data fusion unit 720 is designed to ascertain control signal 140 for the longitudinal guidance, using vehicle identification signal 160, roadway signal 135 and modulation signal 710, and to provide control signal 140 for the longitudinal guidance to a vehicle controller as vehicle component 145.

In the process, it is possible, for example, to rely more heavily on the ML process within the meaning of a data fusion in scenarios which are challenging for the traditional approaches. In good cases, the traditional methods are preferred within the meaning of a data fusion, if these are already able to map the driver expectation well.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for vehicle control, the method comprising the following steps:
   reading in a camera signal representing an optically detected image of a roadway to be driven by a vehicle;
   executing a semantic segmentation of the image represented by the camera signal to detect a free area ahead of the vehicle from the image as a drivable road section, and providing a roadway signal representing the detected drivable road section, the image being a pixel image, and wherein during the semantic segmentation, a drivable surface area or a lane used by the vehicle is segmented in the pixel image as a cohesive area to detect the cohesive area as the drivable road section; and
   ascertaining a control signal for activating at least one vehicle component, using the roadway signal;
   wherein the step of executing the semantic segmentation is executed repeatedly to detect an occurrence of a change of an extension of the drivable road section, and an extension signal is provided which represents the detected change of the extension of the detected drivable road section, the control signal being ascertained using the extension signal in the step of ascertaining, the extension of the drivable road section including a length of the drivable road section.

2. The method as recited in claim 1, wherein, in the step of ascertaining, the control signal is additionally ascertained using a marking signal, the marking signal representing an identified lane marking.

3. The method as recited in claim 1, wherein, in the step of ascertaining, the control signal is ascertained additionally using a vehicle identification signal, the vehicle identification signal representing a detected preceding vehicle.

4. The method as recited in claim 1, wherein, in the step of ascertaining, the control signal is ascertained to activate a transverse guidance of the vehicle within the detected drivable road section.

5. The method as recited in claim 1, wherein, in the step of ascertaining, the control signal is ascertained to activate a longitudinal guidance of the vehicle with respect to a detected end of the detected drivable road section.

6. The method as recited in claim 1, wherein, in the step of ascertaining, the control signal is ascertained as a function of a threshold value with respect to a minimal width or length of the detected drivable road section.

7. The method as recited in claim 6, wherein, in the step of ascertaining, a warning signal for outputting an acoustically and/or visually perceptible warning to the driver is additionally ascertained, as a function of the threshold value.

8. The method as recited in claim 1, wherein, in the step of ascertaining, the control signal is ascertained, using a read-in trip parameter, to set a trip parameter.

9. The method as recited in claim 1, further comprising:
optically detecting the roadway to be driven by the vehicle, using a monocamera sensor unit, to provide the camera signal.

10. A device for vehicle control, the device configured to:
read in a camera signal representing an optically detected image of a roadway to be driven by a vehicle;
execute a semantic segmentation of the image represented by the camera signal to detect a free area ahead of the vehicle from the image as a drivable road section, and provide a roadway signal representing the detected drivable road section, the image being a pixel image, wherein during the semantic segmentation, a drivable surface area or a lane used by the vehicle is segmented in the image as a cohesive area to detect the cohesive area as the drivable road section; and
ascertain a control signal for activating at least one vehicle component, using the roadway signal;
wherein the semantic segmentation is executed repeatedly to detect an occurrence of a change of an extension of the drivable road section, and an extension signal is provided which represents the detected change of the extension of the detected drivable road section, the control signal being ascertained using the extension signal in the step of ascertaining, the extension of the drivable road section including a length of the drivable road section.

11. A non-transitory machine-readable memory medium on which is stored a computer program for vehicle control, the computer program, when executed by a computer, causing the computer to perform the following steps:
reading in a camera signal representing an optically detected image of a roadway to be driven by a vehicle;
executing a semantic segmentation of the image represented by the camera signal to detect a free area ahead of the vehicle from the image as a drivable road section, and providing a roadway signal representing the detected drivable road section, the image being a pixel image, wherein during the semantic segmentation, a drivable surface area or a lane used by the vehicle is segmented in the image as a cohesive area to detect the cohesive area as the drivable road section; and
ascertaining a control signal for activating at least one vehicle component, using the roadway signal;
wherein the step of executing the semantic segmentation is executed repeatedly to detect an occurrence of a change of an extension of the drivable road section, and an extension signal is provided which represents the detected change of the extension of the detected drivable road section, the control signal being ascertained using the extension signal in the step of ascertaining, the extension of the drivable road section including a length of the drivable road section.

\* \* \* \* \*